O. B. CARSON.
OPHTHALMIC MOUNTING.
APPLICATION FILED NOV. 30, 1917.
1,301,101.
Patented Apr. 22, 1919.
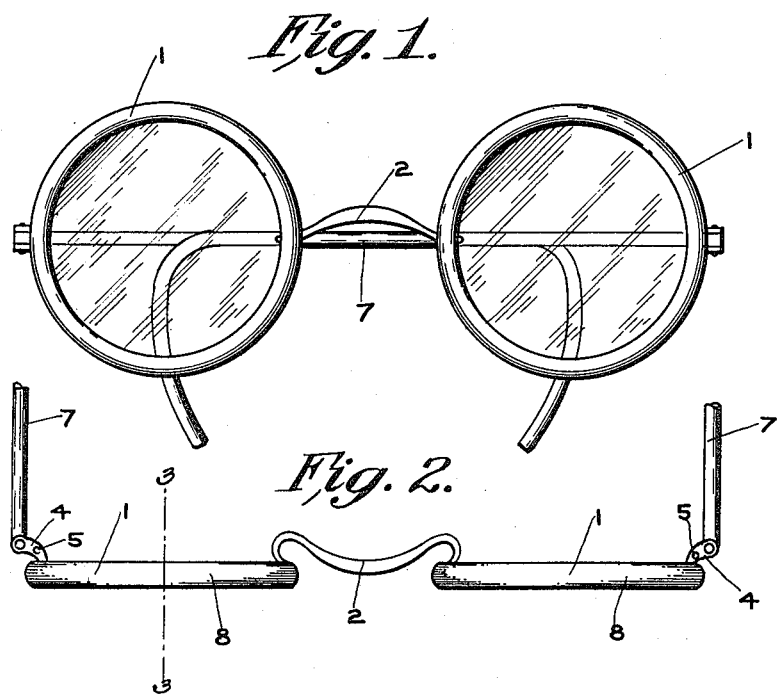
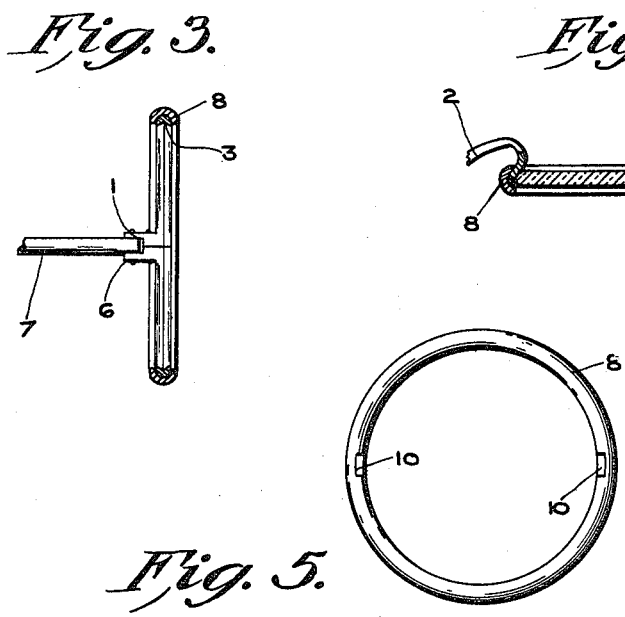
Inventor,
OSWALD B. CARSON
H. H. Styll & H. H. Parsons
Attorneys

UNITED STATES PATENT OFFICE.

OSWALD B. CARSON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,301,101.     Specification of Letters Patent.     Patented Apr. 22, 1919.

Application filed November 30, 1917. Serial No. 204,681.

*To all whom it may concern:*

Be it known that I, OSWALD B. CARSON, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to lens frames, the main object of the present invention being the provision of a frame having a continuous outer rim for the inner metallic rim whereby the unsightly appearance of the bridge and temple connections with the metallic rim are eliminated from the front of the spectacle or eyeglasses.

A further object of the present invention is the provision of a non-metallic covering for the inner metallic rim which is formed of a continuous unbroken material and includes sufficient resiliency to permit of the same being snapped over the inner metallic rim.

A further object of the invention is the provision of a lens frame wherein the bridge and temple connections are located at the rear of the frames and extend outwardly over the rear face of the non-metallic rim whereby the front face of the non-metallic rim will present a smooth and unbroken appearance.

With the above and other objects in view the invention consists in the novel features of construction and the combination and arrangement of parts hereinafter more fully set forth, pointed out in the claims and shown in the accompanying drawings, in which Figure 1 is a front elevation of a pair of spectacles constructed in accordance with my invention.

Fig. 2 is a top plan view.

Fig. 3 is a detail sectional view taken on the line 3—3 of Fig. 2.

Fig. 4 is a transverse sectional view, and

Fig. 5 is a front elevation of the outer non-metallic rim.

Referring now more particularly to the accompanying drawings in which the numerals indicate the several parts throughout the views the numeral 1 indicates the two lens frames which are integrally connected by the nose bridge 2. In the construction of my improved frame the metallic frame which is indicated by the numeral 3 is provided at its meeting ends with the outwardly projecting lugs 4. These lugs are arcuately curved as indicated in Figs. 2 and 3 and detachably connected by means of the screw 5 and are provided at their outer ends with the offset portions 6 to form a receiving space for the inner ends of the temples 7.

The metallic rim is provided with a covering or casing of a non-metallic material as indicated at 8 which can be readily arranged in position upon the metal rim by forcing the same over the outer surface of the non-metallic rim. The rim 8 is provided upon its inner edge with the oppositely disposed notches 10 adapted to receive the temple lugs 4 and the inner ends of the nose bridge whereby the rim 8 will fit tightly over the rim or frame 3. It will be noted that by having the notches or recesses formed in the outer frame or rim 8 they will provide for a suitable amount of resiliency and yieldability so that the same can be readily snapped over the metallic rim 3. It will be apparent that by having these notches or recesses formed in the outer rim the reduced portion of the non-metallic rim at the notches will permit the rim to give or yield when pressure is brought to bear upon the outer face thereof and that when the metallic rim is placed in position, the non-metallic rim, which is formed from zyl or hard rubber, can be stretched to a certain extent by applying a sufficient amount of heat thereto.

It will be readily apparent that the connections between the rim or frame 3 and the bridge and nose piece are disposed behind the non-metallic rim 8 whereby they will not be exposed at the front of the eyeglasses or spectacles. It will be understood that the non-metallic frame or rim 8 may be formed of shell or zylonite or a similar material and will contain sufficient resiliency whereby the same can be readily snapped over the metallic rim 3.

In assembling my improved frame the lenses are first inserted within the metallic rims 3 and the lugs 4 are then secured together in order that the lenses may be securely held in place within the rims. After the lenses have been secured in place in the metallic rim, the non-metallic rim is then readily snapped into position over the metallic rim by heating the same to a certain degree.

It will be readily apparent from the foregoing description taken in connection with the accompanying drawings that I have provided a novel construction in lens frames wherein the inner metallic rim 3 is suitably inclosed within a continuous non-metallic rim to provide a smooth and neat appearance for the front of the eyeglasses and spectacles. Furthermore it will be apparent that the non-metallic rim 8 by being provided with the notches 10 will be resilient enough so that it can be readily snapped over the metallic rim. As illustrated in Figs. 3 and 4 it will be noted that the metallic inner rim 3 is provided with a curved outer face that fits snugly within the arcuate recess of the non-metallic rim 8 whereby after the outer rim 8 is positioned upon the inner rim 3 it will be securely held in place against any lateral displacement.

It will be noted that by having the lugs 4 curved as illustrated in Fig. 4 it will bring the ends of the temples out to the outer side of the outer rim 8 so that the temples will be disposed in their correct position upon the side of the face.

I claim:

1. A lens frame including an open metallic rim, a continuous non-metallic outer rim arranged thereover and said outer rim being provided with oppositely disposed notches in one face thereof as and for the purpose set forth.

2. A lens frame including a metallic rim, having a nose bridge and temple lugs secured to the opposite sides thereof upon one face of the same, a non-metallic rim removably arranged over the outer face of the metallic rim and said non-metallic rim having oppositely disposed notches therein to receive the ends of the bridge and the temple lugs.

3. A lens frame including a metallic rim, a continuous non-metallic rim removably arranged over the outer face of the metallic rim, and a nose bridge and temple lugs secured to opposite sides thereof upon one face of the same.

4. A lens frame including a metallic rim, a continuous non-metallic outer rim arranged thereover, said outer rim being provided with oppositely disposed notches in one face thereof, and a temple lug secured to one face of the metallic rim and extending through one of the notches to the outer face of the non-metallic rim as and for the purpose set forth.

5. A lens frame including a metallic rim, a continuous non-metallic outer rim arranged thereover, said outer rim being provided with oppositely disposed notches in one face thereof, a temple lug secured to one face of the metallic rim and extending through one of the notches to the outer face of the non-metallic rim, and a temple secured to the temple lug the end of which is in a plane substantially the same as the outer face of the non-metallic rim.

6. As an article of manufacture, a spectacle or eyeglass frame comprising metallic rim parts for engaging and holding the lenses, a bridge having connection at its opposite ends to the said metallic rim parts and continuous or endless non-metallic rim parts encircling the said metallic rim parts.

7. As an article of manufacture, a spectacle or eyeglass frame comprising metallic rim parts adapted to engage and hold the edges of the lenses, said rim parts respectively being split transversely, a bridge having connection at its opposite ends to the rear edges of the said metallic rim parts, temple lugs or projections connected to the rear edges of the said metallic rim parts at the adjacent opposing ends thereof, and continuous or endless non-metallic rim parts in engagement with the outer peripheral surface of the said metallic rim parts.

In testimony whereof I have affixed my signature, in presence of two witnesses.

OSWALD B. CARSON.

Witnesses:
J. N. PHILLIPS,
A. C. CLARK.